United States Patent
Chibon et al.

(10) Patent No.: US 11,755,309 B2
(45) Date of Patent: Sep. 12, 2023

(54) TAGGING PACKAGES IN AN APPLICATION ECOSYSTEM

(71) Applicant: Red Hat, Inc., Raleigh, NC (US)

(72) Inventors: Pierre-Yves Chibon, Paris (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 39 days.

(21) Appl. No.: 17/579,480

(22) Filed: Jan. 19, 2022

(65) Prior Publication Data
US 2023/0229419 A1 Jul. 20, 2023

(51) Int. Cl.
G06F 8/65 (2018.01)
G06F 8/71 (2018.01)
G06F 8/61 (2018.01)

(52) U.S. Cl.
CPC .............. G06F 8/65 (2013.01); G06F 8/61 (2013.01); G06F 8/71 (2013.01)

(58) Field of Classification Search
None
See application file for complete search history.

(56) References Cited

U.S. PATENT DOCUMENTS

| | | | | |
|---|---|---|---|---|
| 7,539,686 B2* | 5/2009 | Shepard | ........... | H04L 67/34 |
| 8,255,363 B2* | 8/2012 | Johnson | ............ | G06F 8/71 |
| | | | | 717/122 |
| 8,443,361 B2* | 5/2013 | Vidal | ............ | G06F 8/71 |
| | | | | 717/177 |
| 9,110,756 B1* | 8/2015 | Guo | ............ | G06F 8/65 |
| 9,489,188 B1 | 11/2016 | Guo et al. | | |
| 9,880,825 B1* | 1/2018 | Doyle | ............ | G06F 11/1438 |
| 2019/0324733 A1* | 10/2019 | Lubyanskyy | ............ | G06F 8/76 |
| 2022/0253297 A1* | 8/2022 | Wallis | ............ | G06F 8/65 |

FOREIGN PATENT DOCUMENTS

JP 2019219866 A 12/2019

OTHER PUBLICATIONS

Kumar, Rahul. "How To Exclude Packages from Apt-Get Upgrade", https://tecadmin.net/exclude-packages-from-apt-upgrade/, posted on Apr. 2, 2017 (10 pages).
Red Hat, Inc. "Red Hat Network Satellite—Reference Guide—Configuration", https://access.redhat.com/documentation/en-US/red_hat_network_satellite/5.4/html/reference_guide/sect-reference_guide-rhua-configuration, retrieved from the Internet on Sep. 30, 2021 (6 pages).

* cited by examiner

Primary Examiner — Marina Lee
(74) Attorney, Agent, or Firm — Womble Bond Dickinson (US) LLP

(57) ABSTRACT

Embodiments of the present disclosure relate to systems and methods for creating logical groups of packages by tagging individual packages with a tag associated with metadata corresponding to packages that are part of the group. A group of packages may be defined from a plurality of packages that make up an application ecosystem using the tag. A command to perform a first operation of a set of operations performed by the package manager on the group of packages may be provided to a package manager, wherein the command may reference the tag and wherein the package manager is modified to perform each of the set of operations on one or more of the plurality of packages simultaneously. The first operation may be performed by the package manager on the group of packages simultaneously using the metadata to identify each package that is part of the group.

20 Claims, 10 Drawing Sheets

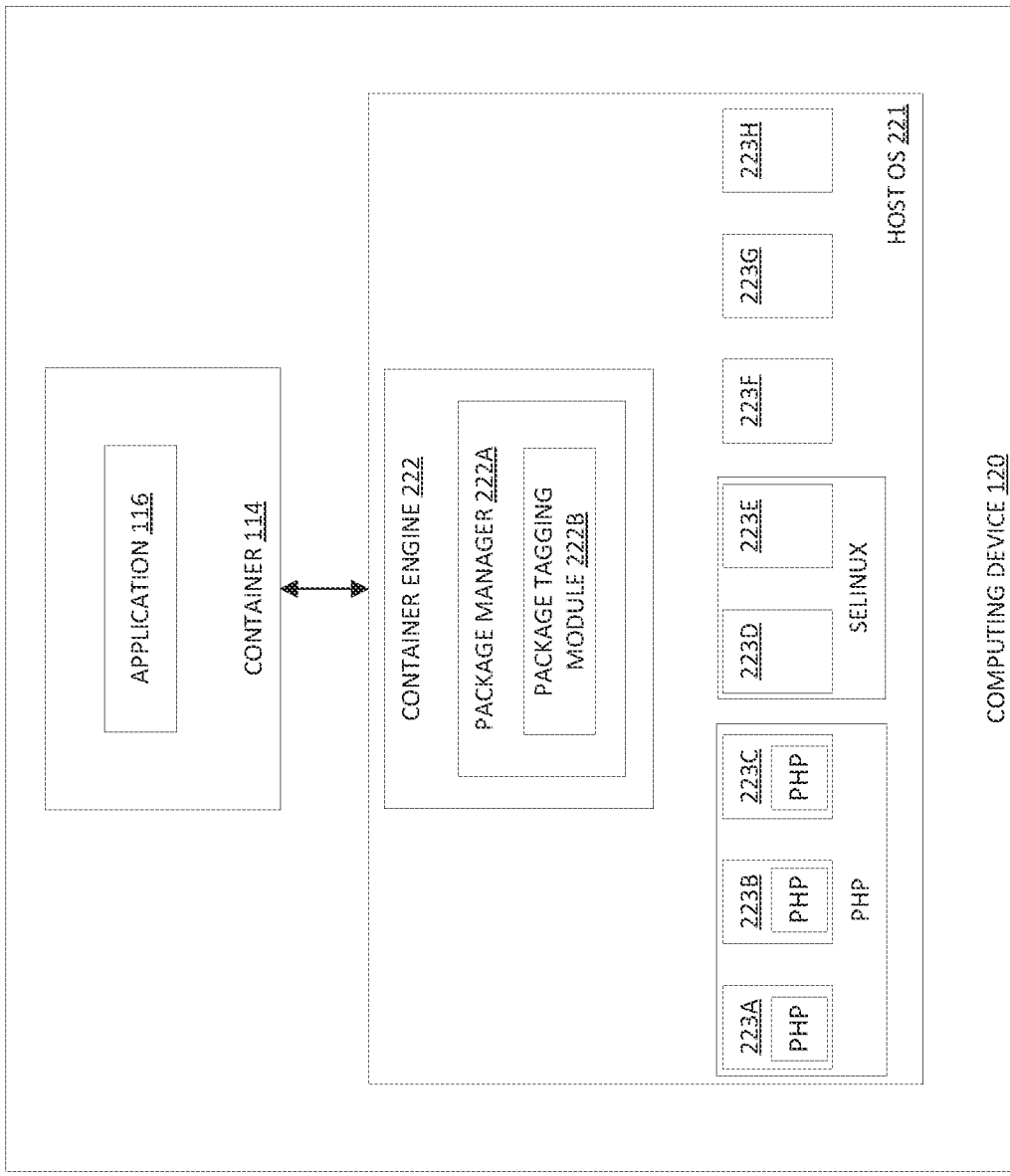

TAGGING PACKAGES IN AN APPLICATION ECOSYSTEM

TECHNICAL FIELD

Aspects of the present disclosure relate to containers, and more particularly, to management of packages utilized by an operating system to run various applications on containers.

BACKGROUND

Containers are one example of an environment in an operating system where applications may run, while being isolated from any other components of a host machine, network, or data center etc. Multiple containers may execute on a single operating system kernel and share the resources of the hardware the operating system is running on. All of the files, libraries and dependencies necessary to run applications in a container may be provided by an image file(s). An image file may be comprised of a set of base layers that define the runtime environment, as well as the packages and utilities necessary for a containerized application to run. A container may include the base layers from an image file as well as an in-memory layer in which the containerized application may write/modify data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2B is a block diagram that illustrates tagging of packages of a host OS, in accordance with some embodiments of the present disclosure.

DETAILED DESCRIPTION

Figure 1A:
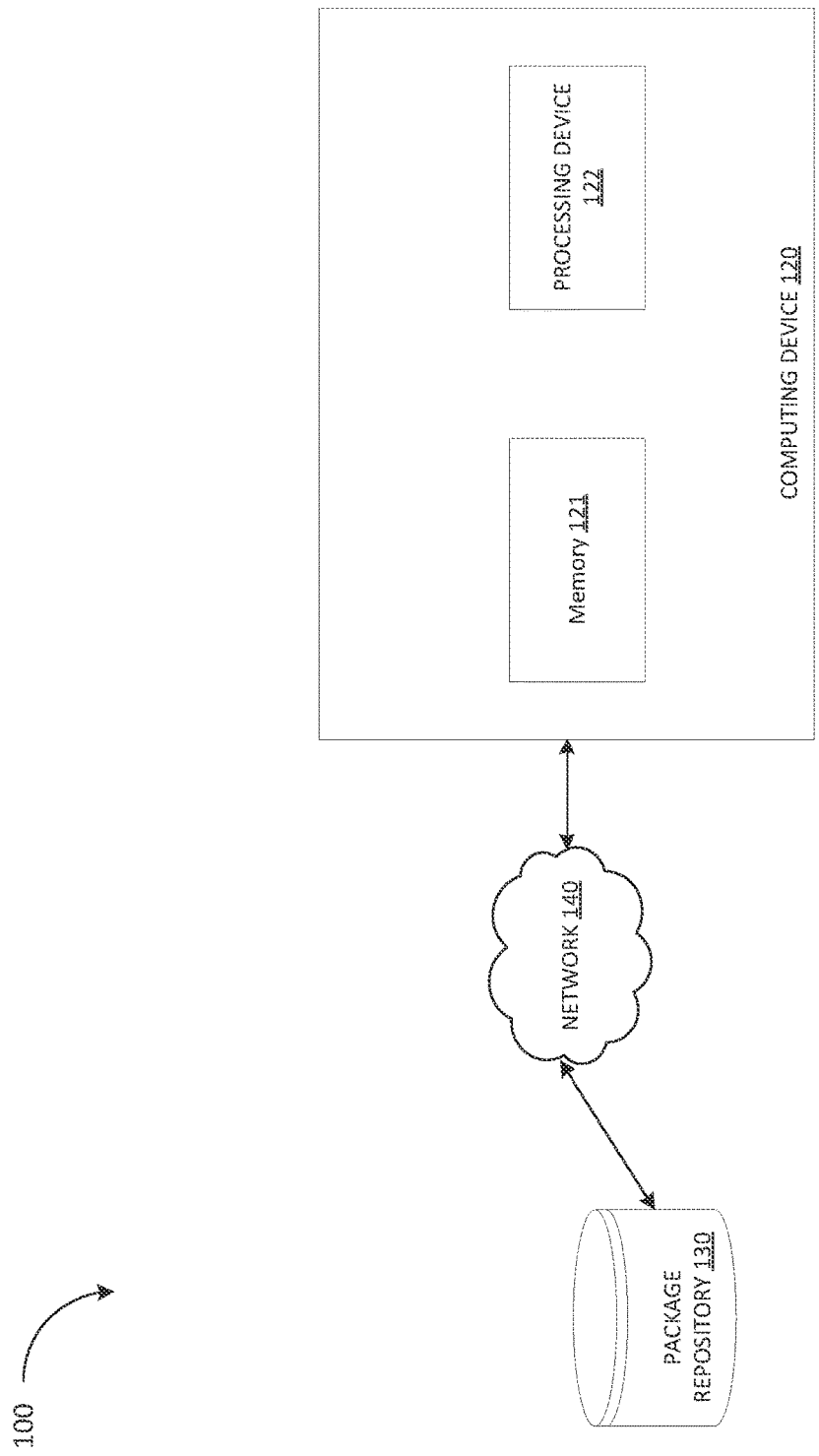
FIG. 1A is a block diagram that illustrates an example network, in accordance with some embodiments of the present disclosure.

Certain layers of an image file may correspond to various packages and libraries required to run the application, while other layers may correspond to various operating system packages via which applications are delivered and which are often shared among different applications. The packages and libraries used to run applications (referred to as an application ecosystem) may be managed by a package manager such as Dandified YUM (DNF) or RPM package manager (RPM). Package management may refer to a method of installing, updating, removing, and keeping track of versions/software updates for packages in e.g., a Linux system. For example, the package manager decides what packages should be grouped together and a basis on which they will update (e.g., packages in a particular group will not update except for necessary bug fixes and/or security fixes). Different Linux distributions may utilize different package managers.

However, each user may have a different view of how packages are to be grouped and a basis on which they are to be updated that is not consistent with how the package manager groups packages or updates them. Although users may determine a grouping of packages that is optimal for their particular application ecosystem and needs, and may even be able to tag them, different users will want to group packages differently depending on the applications that they are running on their server. For example, a basic web-application that serves static web-pages will have a different dependency tree (and thus group) than a full-fledge governmental website issuing TLS certificates to authenticate their clients. In addition, package managers cannot natively operate on groups of packages. For example, although the package manager of a system may be able to exclude some packages from an operation (e.g., using the DNF exclude function), it can only do so at the individual package level and cannot handle groups of packages. Thus, at a command line level a user would have to individually identify each package they wish to exclude when using the DNF exclude function. Although some systems attempt to use multiple package managers to provide a level of modularity in defining groups of packages, such systems do not scale because there are more users and use cases than there are package managers.

The present disclosure addresses the above-noted and other deficiencies by using a processing device to create, from a plurality of packages that make up an application ecosystem, logical groups of packages by tagging individual packages with a tag comprising a configuration file having metadata for each package that is part of the group. As each package is tagged, the metadata of the tag is updated with a name and version information of the tagged package. A package manager may be modified to perform operations (e.g., update, exclude from updating) on multiple packages simultaneously so that packages that are defined as a group can be operated on together. The tag may be provided to the package manager which may be modified to understand the metadata of the tag and use the metadata to identify which packages are part of the group defined by the tag. When a command to perform an operation that references the tag is issued to the package manager, the package manager may identify each package that is part of the group using the metadata, and then perform the operation on the group of packages simultaneously.

FIG. 1A is a block diagram that illustrates an example network 100. As illustrated in FIG. 1A, the network 100 includes a computing device 120, a package repository 130, and a network 140. The computing device 120 and the package repository 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 120 and package repository 130. The computing device 120 and package repository 130 may include hardware such as processing device 122 (e.g., processors, central processing units (CPUs), memory 121 (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

FIG. 1A and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The computing device 120 and package repository 130 may comprise any suitable type of computing device or machine that has a programmable processor including, for example, server computers, desktop computers, laptop computers, tablet computers, smartphones, set-top boxes, etc. In some examples, the computing device 120 and package repository 130 may comprise a single machine or may include multiple interconnected machines (e.g., multiple servers configured in a cluster). The computing device 120 and package repository 130 may be implemented by a common entity/organization or may be implemented by different entities/organizations. For example, computing device 120 may be operated by a first company/corporation and package repository 130 may be operated by a second company/corporation. The computing device 120 and package repository 130 may each execute or include an operating system (OS), as discussed in more detail below. The OSs of computing device 120 (shown in FIG. 1B as host OS 221) and package repository 130 may manage the execution of other components (e.g., software, applications, etc.) and/or may manage access to the hardware (e.g., processors, memory, storage devices etc.) of their respective computing device.

Figure 1B:
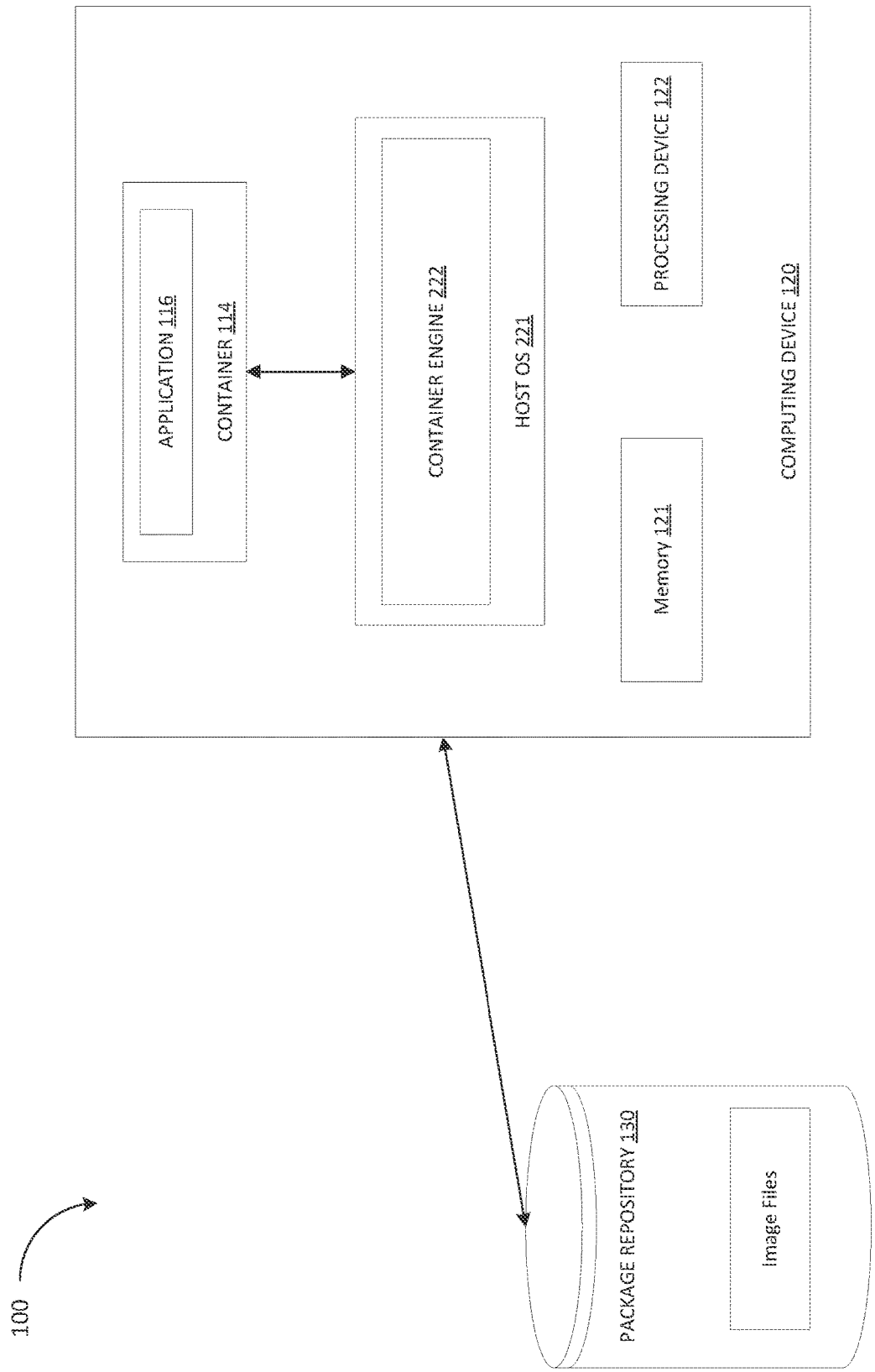
FIG. 1B is a block diagram that illustrates an example network, in accordance with some embodiments of the present disclosure.

As illustrated in FIG. 1B, the computing device 120 may include a container 114. In some embodiments, the container 114 may execute on a container engine 222 which executes on top of the host OS 221 of computing device 120. The container engine 222 may allow different containers to share the host OS 221 (e.g., the OS kernel, packages 223, binaries, libraries thereof etc.) and may also perform other functions, as discussed in more detail below. The container 114 may be isolated, in that it is not connected to any other device or component of system 100, whether virtual or otherwise. Container 114 may execute application 116, which may be any application that requires certain packages 223 to facilitate its operation.

Figure 2A:
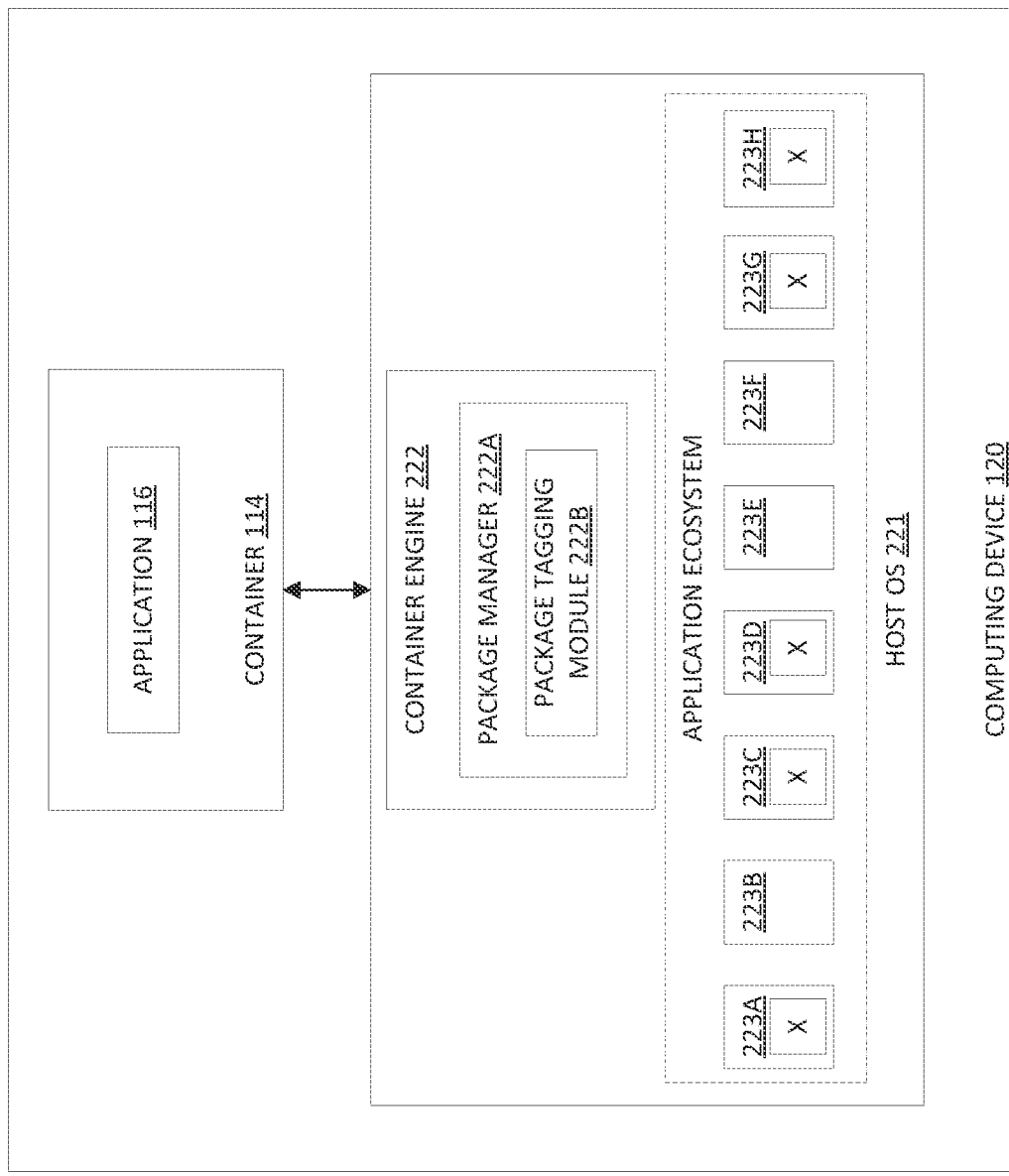
FIG. 2A is a block diagram that illustrates tagging of packages of a host operating system (OS), in accordance with some embodiments of the present disclosure.

As shown in FIG. 2A, the container 114 may share the OS kernel and packages 223 (e.g., libraries, binary files and source files) of the host OS 221 with other containers (not shown) that are executing on the computing device 120. Although FIG. 2A illustrates one container 114, the computing device 120 (and any of the nodes 150) may execute multiple containers in other embodiments. Each container may have one or more respective file systems, memories, devices, network ports, etc., for accessing the physical resources of the computing device it is running on (e.g., processing device 122 and memory 121, shown in FIGS. 1A and B).

The container engine 222 may allow different containers to share the host OS 221 (including e.g., the OS kernel as well as relevant packages 223 including any associated libraries, binary and/or source files etc.) of the computing device 120. For example, the container engine 222 may multiplex the packages 223 of the host OS 221 between multiple containers as discussed in further detail herein. The container engine 222 may also facilitate interactions between the container 114 and the resources of the computing device 120 and may manage requests from the container 114 to access certain packages 223 of the host OS 221. Although FIG. 2A shows the packages 223 as included within the host OS 221, in some embodiments the packages 223 may be stored separately (e.g., within package repository 130) and accessed by host OS 221 as necessary.

As discussed above, the host OS 221 may comprise a plurality of packages 223, each of which may be a program that provides certain functionality (e.g., for executing an application). The container engine 222 may also include a software package manager 222A that interfaces with repositories in the package repository 130 to search for packages, as well as install, update, and remove packages on host OS 221. The software package manager 222A may be any appropriate package management software such as Dandified Yum, for example. The software package manager 222A may automatically compute dependencies of a package and determine any actions required to install a package. Each of the plurality of packages 223 may be in any appropriate format, such as e.g., the ".rpm" format. Stated differently, each package may comprise an RPM file (e.g., based on Fedora, RHEL, etc.) or any other appropriate operating system packaging unit. The software package manager 222A may install, update, and remove packages and their dependencies on the computing device 120. The software package manager 222A may facilitate maintenance of packages and their dependencies by automatically checking for further dependencies and determining the actions required to install those dependencies.

As can be seen in FIG. 2A, the host OS 221 may comprise a set of packages 223 that form an application ecosystem. The user may assign (or "mark") certain packages that they wish to group together a tag, thereby defining all of the tagged packages as a logical group. The tag may be associated with metadata indicating which packages are part of the logical group and a version of each package that is part of the logical group (hereinafter referred to as a "group of packages") as discussed in further detail herein. In some embodiments, the tag may comprise a configuration file in which the metadata may be stored. In other embodiments, the package manager 222A may include a database (not shown) in which the metadata may be stored. As each package 223 is marked with the tag, the metadata associated with the tag may be updated with the name of the package as well as a version of the package. For example, the user may tag a group of packages 223A, 223C, 223D, and 223H with a tag referred to as "X" (as shown in FIG. 2A), which may comprise a configuration file that, upon completion of the tagging, includes metadata associated with the tag indicating that packages 223A, 223C, 223D, and 223H are a part of a group (referred to herein as "group X"). Alternatively, once the user tags packages 223A, 223C, 223D, and 223H with tag X, metadata associated with the tag and stored in the package manager 222A may indicate that packages 223A, 223C, 223D, and 223H are a part of group X. The package manager 222A may be modified with a package tagging module 222B which may enable the package manager 222A to understand the metadata associated with a tag as well as equip the package manager 222A with the functionality to identify packages in the group of packages defined by the tag based on the metadata. More specifically, the package tagging module 222B may enable the package manager 222A to understand that when a user references a tag in a command, the package manager 222A should reference the tag's metadata to infer what packages are part of the group. The package tagging module 222B may further enable the package manager 222A to apply its standard set of operations (e.g., add, remove, exclude from removal, update, exclude from updating) to groups of packages defined by tags instead of packages individually so that the package manager 222A can process groups of packages.

In one example shown in FIG. 2B, the user may run the application 116 in PHP 7.2 (or any appropriate general purpose scripting language), and may wish to prevent upgrading PHP to a newer version for compatibility reasons while continuing to update all the other components in the application ecosystem (e.g., kernel, SElinux, glibc). In this scenario, the user may mark the packages 223A-223C corresponding to PHP with a PHP tag. In some embodiments, the tagging may be performed by the package manager 222A in response to a package manager command. In other embodiments, the code responsible for the package tagging functionality may also expose an API of the package manager 222A that other tools can also utilize to perform the tagging function. In some embodiments, the component that ultimately performs the tagging may depend on where the metadata corresponding to the tags is stored. For example, if the metadata is stored in the package manager 222A's database, then the action can be performed via the package manager 222A's commands. If the metadata is stored outside the package manager 222A's database, the package manager 222A may expose an API to make the package tagging functionality available to perform by other tools/libraries.

As each package 223A-C is tagged, information about that package (e.g., a package name and a version of the package) is added to the metadata associated with the PHP tag (stored either in a configuration file or the package manager 222A). In some embodiments, the user may provide the PHP tag to the package manager 222A which may store the PHP tag. In other embodiments, the user may issue a command that references the PHP tag to the package manager 222A, which subsequently stores the PHP tag. In response to a command to e.g., update the entire application ecosystem except packages that are tagged with the PHP tag (e.g., "dnf update --excludetag=PHP"), the package manager 222A may identify each of the packages 223A-C using the metadata associated with the PHP tag and use its exclude from updating operation (modified by package tagging module 222B) to exclude the group of packages defined by the PHP tag (packages 223A-C) and their dependencies from the update of the packages of the application ecosystem. The package manager 222A may exclude the packages defined by the PHP tag as a group, instead of excluding each package marked with the PHP tag individually. In another example, the command may be a command to update the group of packages defined by the PHP tag with e.g., a necessary bug fix ("dnf update --tag=PHP").

Figure 3A:
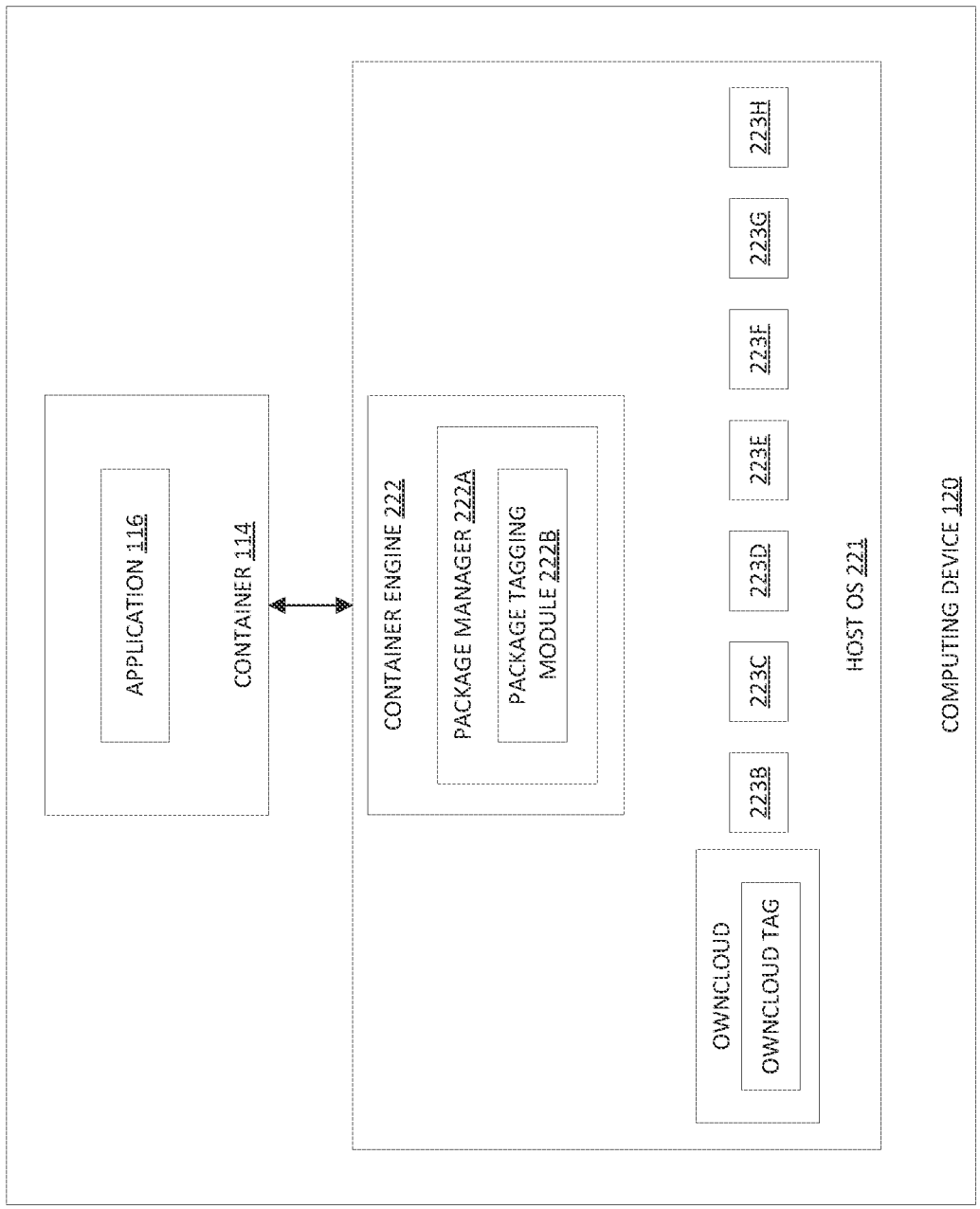
FIG. 3A is a block diagram that illustrates the use of a tag to manage how a package is updated, in accordance with some embodiments of the present disclosure.

FIG. 3A illustrates the computing device 120 in accordance with some embodiments of the present disclosure wherein the user may manually process groups of packages with a tag using the set of commands of the package manager 222A. The user may run a command such as "dnf install owncloud --tag=owncloud," which may install an application called "owncloud" and mark it with a tag called "owncloud." In this way, the user may update their entire application ecosystem except for the application owncloud by running a command such as "dnf update --excludetag=owncloud." Alternatively, the user may update only packages that have been assigned the owncloud tag by running a command such as "dnf update --tag=owncloud."

Figure 3B:
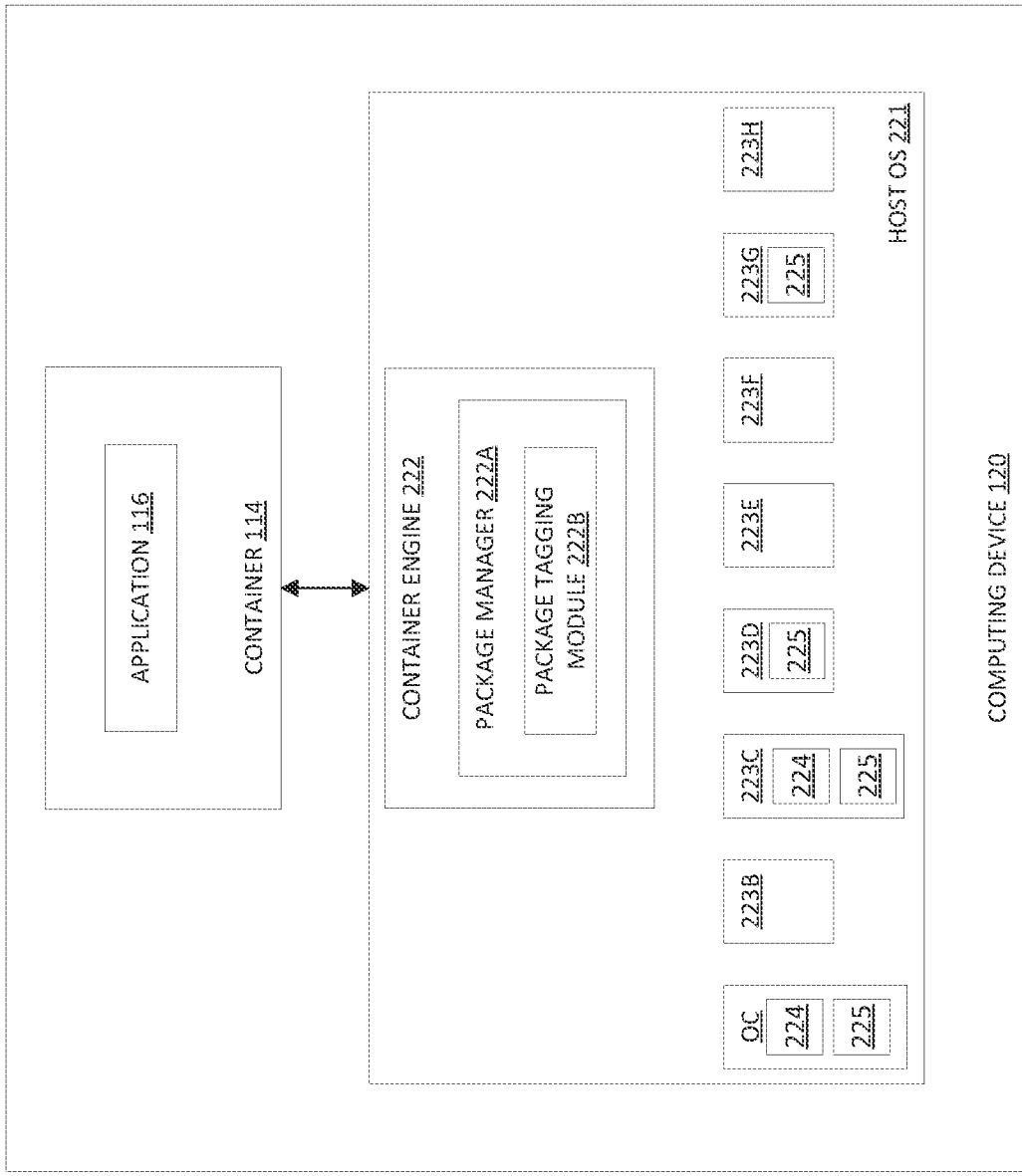
FIG. 3B is a block diagram that illustrates groups and sub-groups of packages defined using tags, in accordance with some embodiments of the present disclosure.

A particular package can also be assigned multiple tags, and thus be part of multiple groups of packages, as shown in FIG. 3B. In FIG. 3B (which continues the example of FIG. 3A), the user may run a command such as "dnf install owncloud --tag=owncloud, production" which would install the application called "owncloud" (shown in FIG. 3B as "OC") and mark it with tags called "owncloud" (shown in FIG. 3B as 224) and "production" (shown in FIG. 3B as 225), where the production tag has also been assigned to other packages 223 running in the application ecosystem. As can be seen in FIG. 3B, the group of packages with the owncloud tag are a subset of the group of packages with the production tag. Instead of listing each of the packages the user does not want to update, the user may run a command such as "dnf update --excludetag=production." In the same way, the user can update only a subset of the packages with the production tag by running a command such as "dnf update --excludetag=owncloud" which will update only the packages assigned the owncloud tag and refrain from updating any of the other packages assigned the production tag. As can be seen, embodiments of the present disclosure allow a user to create groups and sub groups etc. through which they can establish multiple levels of granularity for package management. In this way, embodiments of the present disclosure provide users fine grained control over what they want to update to avoid inadvertently updating certain packages etc. that they did not intend to and potentially breaking their application ecosystem. In some scenarios, packages that are part of multiple groups may be subject to duplicate requests (e.g., duplicate update requests). The package manager 222A may utilize the version metadata for each tag associated with the package to prevent such scenarios.

The user may search the package manager 222A for groups or packages that have been assigned a certain tag. The user may also define package suites for different versions of their application ecosystem. For example, the user may define a staging set of packages where they carry out testing/debugging etc. From a package manager 222A footprint point of view, the user may download one version of a package and reuse it across multiple groups of packages/tags, and does not need to download several versions of the package or have different application ecosystem variants of the package.

Although FIGS. 2A-3B illustrate the package tagging module 222B as implemented at the package manager level (e.g., as a modification to the functionality of the package manager 222A), in some embodiments, the functionality of the package tagging module 222B may be implemented as a separate macro (not shown in the FIGS.) running on the package manager 222A that will unpack itself when a configuration file is received. In such embodiments, the functionality of the package tagging module 222B may enable the package manager 222A to translate a command line statement such as "exclude tag X" to a set of individual exclude commands such as e.g., "exclude packages A, B, C, and D." In this way, the functionality of the package tagging module 222B may enable older package manager systems that have not been modified at the package manager level to be compatible with (and understand/process) tags assigned to packages (and groups of packages defined thereby) by the user.

Although a tag can be used to define groups of packages at the local level, embodiments of the present disclosure allow such tags to be pushed up to the package manager 222A at a global level. Thus, a user who has defined a group of packages at a local level using a tag may promote their tag at a global level. More specifically, the package tagging module 222B may allow tags to be understood at a general package manager level (i.e., understood by any package manager e.g., Yum, git etc.), enabling the package manager 222A to exchange tags from across the application ecosystem with other package managers that are similarly enabled. By having this functionality integrated into package managers at a global level instead of locally, embodiments of the present disclosure also prevent the particular users of each local environment from having to define complex scripts etc. to perform this functionality.

Thus, instead of having only a localized version of tags, tags may be made available at a global level so that other users or groups of users can download the tag and generate the group(s) of packages defined by that tag. This benefits end user experience and consistency by enabling a user to share a group of packages among various package managers and make the group of packages available at an application ecosystem level. Groups of packages can be downloaded by other users (e.g., system admins etc.) that wish to replicate the user's application ecosystem. Instead of pulling each of the individual packages that create the user's application ecosystem, other users can bind themselves to the user's application ecosystem from a consistency and update management point of view by downloading the user's tags. It should be noted in some embodiments where metadata associated with a tag is stored in a configuration file of the tag, the package manager 222A may simply make the tag available globally, while in other embodiments where metadata associated with the tag is stored in a database of the package manager 222A, the package manager 222A may make the tag and the associated metadata available globally.

Figure 4:
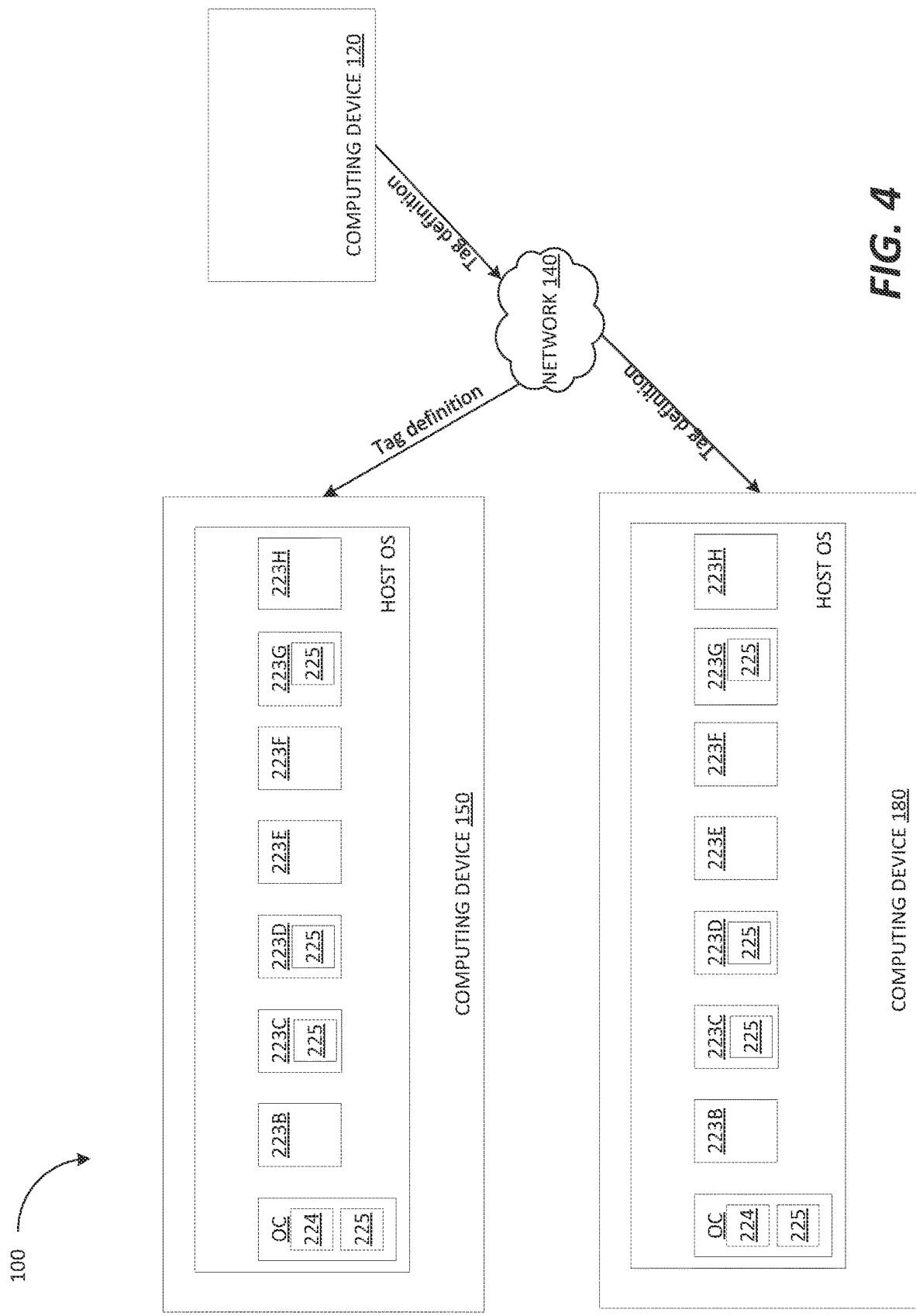
FIG. 4 is a block diagram that illustrates groups and sub-groups of packages defined using tags, in accordance with some embodiments of the present disclosure.

As shown in FIG. 4, embodiments of the present disclosure provide consistency across distributed systems (shown in the example of FIG. 4 as computing devices 120, 150, and 180 which may be e.g., a fleet of IoT devices) so that the same user experience may be had across all of them. For example, by making a tag or set of tags available globally, a user can ensure consistency from either an exclude or include perspective for update purposes without individual users needing to create their own specific application ecosystems from scratch. FIG. 4 continues the example of FIG. 3B, where the user has installed the application called "owncloud" (shown in FIG. 3B as "OC") and marked it with tags called "owncloud" (shown in FIG. 3B as 224) and "production" (shown in FIG. 3B as 225). The production tag has also been assigned to other packages 223C, 223D, and 223G running in the application ecosystem while the owncloud tag has also been assigned to package 223C running in the application ecosystem such that the group of packages defined by the owncloud tag is a subset of the group of packages defined by the production tag.

As shown in FIG. 4, package managers of computing devices 150 and 180 (not shown) may download the production and owncloud tags (which have been made globally available by the package manager 222A of computing device 120) and implement application ecosystems that are exact replicas of the application ecosystem of computing device 120. In this way, the users of computing devices 150 and 180 may update only a subset of the packages with the production tag by running a command such as "dnf update --excludetag=owncloud" which will update only the packages assigned the owncloud tag and refrain from updating any of the other packages assigned the production tag.

Figure 5:
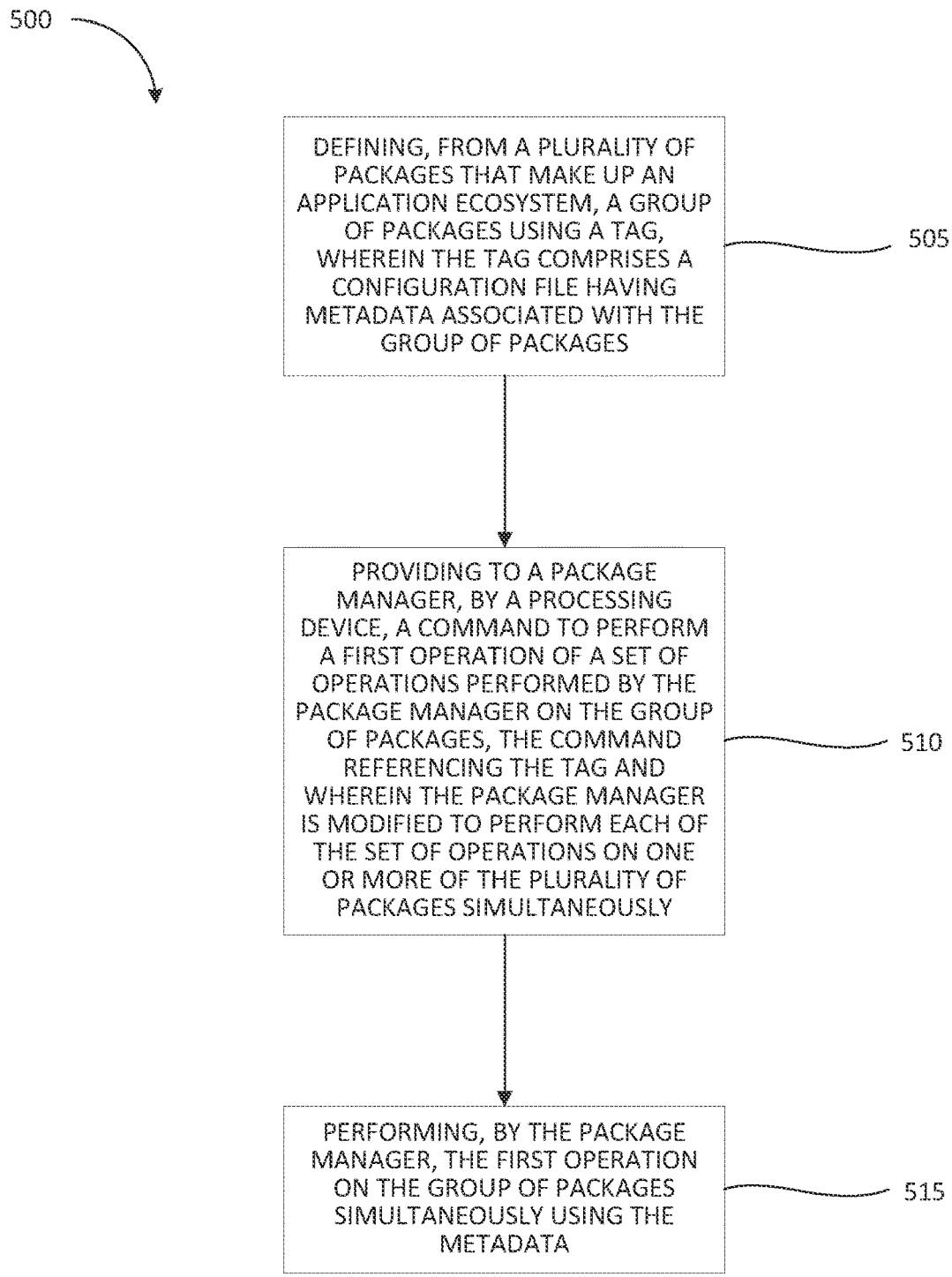
FIG. 5 is a flow diagram of a method of defining groups of packages based on a user definition and processing the groups of packages using a package manager, in accordance with some embodiments of the present disclosure.

FIG. 5 is a flow diagram of a method 500 for defining groups of packages based on user assigned tags and processing the groups of packages using a package manager, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 120 illustrated in FIG. 2A).

Referring simultaneously to FIGS. 2A-3B, the method 500 begins at block 505, where the user may assign (or "mark") certain packages that they wish to group together a tag, thereby defining all of the tagged packages as a logical group. The tag may be associated with metadata indicating which packages are part of the logical group and a version of each package that is part of the logical group (hereinafter referred to as a "group of packages") as discussed in further detail herein. In some embodiments, the tag may comprise a configuration file in which the metadata may be stored. In other embodiments, the package manager 222A may include a database (not shown) in which the metadata may be stored. As each package 223 is marked with the tag, the metadata associated with the tag may be updated with the name of the package as well as a version of the package. For example, the user may tag a group of packages 223A, 223C, 223D, and 223H with a tag referred to as "X" (as shown in FIG. 2A), which may comprise a configuration file that, upon completion of the tagging, includes metadata associated with the tag indicating that packages 223A, 223C, 223D, and 223H are a part of a group (referred to herein as "group X"). Alternatively, once the user tags packages 223A, 223C, 223D, and 223H with tag X, metadata associated with the tag and stored in the package manager 222A may indicate that packages 223A, 223C, 223D, and 223H are a part of group X. The package manager 222A may be modified with a package tagging module 222B which may enable the package manager 222A to understand the metadata associated with a tag as well as equip the package manager 222A with the functionality to identify packages in the group of packages defined by the tag based on the metadata. More specifically, the package tagging module 222B may enable the package manager 222A to understand that when a user references a tag in a command, the package manager 222A should reference the tag's metadata to infer what packages are part of the group. The package tagging module 222B may further enable the package manager 222A to apply its standard set of operations (e.g., add, remove, exclude from removal, update, exclude from updating) to groups of packages defined by tags instead of packages individually so that the package manager 222A can process groups of packages.

At block 510, the user may provide the tag to the package manager 222A, which has been modified to understand the tag and perform each of its set of operations on multiple packages simultaneously. In one example shown in FIG. 2B, the user may run the application 116 in PHP 7.2 (or any appropriate general purpose scripting language), and may wish to prevent upgrading PHP to a newer version for compatibility reasons while continuing to update all the other components in the application ecosystem (e.g., kernel, SElinux, glibc). In this scenario, the user may mark the packages 223A-223C corresponding to PHP with a PHP tag. In some embodiments, the tagging may be performed by the package manager 222A in response to a package manager command. In other embodiments, the code responsible for the package tagging functionality may also expose an API of the package manager 222A that other tools can also utilize to perform the tagging function. In some embodiments, the component that ultimately performs the tagging may depend on where the metadata corresponding to the tags is stored. For example, if the metadata is stored in the package manager 222A's database, then the action can be performed via the package manager 222A's commands. If the metadata is stored outside the package manager 222A's database, the package manager 222A may expose an API to make the package tagging functionality available to perform by other tools/libraries.

As each package 223A-C is tagged, information about that package (e.g., a package name and a version of the package) is added to the metadata associated with the PHP tag (stored either in a configuration file or the package manager 222A). In some embodiments, the user may provide the PHP tag to the package manager 222A which may store the PHP tag. In other embodiments, the user may issue a command that references the PHP tag to the package manager 222A, which subsequently stores the PHP tag. In response to a command to e.g., update the entire application ecosystem except packages that are tagged with the PHP tag (e.g., "dnf update --excludetag=PHP"), the package manager 222A may at block 515 identify each of the packages 223A-C using the metadata associated with the PHP tag and use its exclude from updating operation (modified by package tagging module 222B) to exclude the group of packages defined by the PHP tag (packages 223A-C) and their dependencies from the update of the packages of the application ecosystem. The package manager 222A may exclude the packages defined by the PHP tag as a group, instead of excluding each package marked with the PHP tag individually. In another example, the command may be a command to update the group of packages defined by the PHP tag with e.g., a necessary bug fix ("dnf update --tag=PHP").

FIG. 3A illustrates the computing device 120 in accordance with some embodiments of the present disclosure wherein the user may manually process groups of packages with a tag using the set of commands of the package manager 222A. The user may run a command such as "dnf install owncloud --tag=owncloud," which may install an application called "owncloud" and mark it with a tag called "owncloud." In this way, the user may update their entire application ecosystem except for the application owncloud by running a command such as "dnf update --excludetag=owncloud." Alternatively, the user may update only packages that have been assigned the owncloud tag by running a command such as "dnf update --tag=owncloud."

A particular package can also be assigned multiple tags, and thus be part of multiple groups of packages, as shown in FIG. 3B. In FIG. 3B (which continues the example of FIG. 3A), the user may run a command such as "dnf install owncloud --tag=owncloud, production" which would install the application called "owncloud" (shown in FIG. 3B as "OC") and mark it with tags called "owncloud" (shown in FIG. 3B as 224) and "production" (shown in FIG. 3B as 225), where the production tag has also been assigned to other packages running in the application ecosystem. As can be seen in FIG. 3B, the group of packages with the owncloud tag are a subset of the group of packages with the production tag. Instead of listing each of the packages the user does not want to update, they may run a command such as "dnf update --excludetag=production." In the same way, the user can update only a subset of the packages with the production tag by running a command such as "dnf update --excludetag=owncloud" which will update only the packages assigned the owncloud tag and refrain from updating any of the other packages assigned the production tag. As can be seen, embodiments of the present disclosure allow a user to create groups, sub groups etc. through which they can establish multiple levels of granularity for package management.

Figure 6:
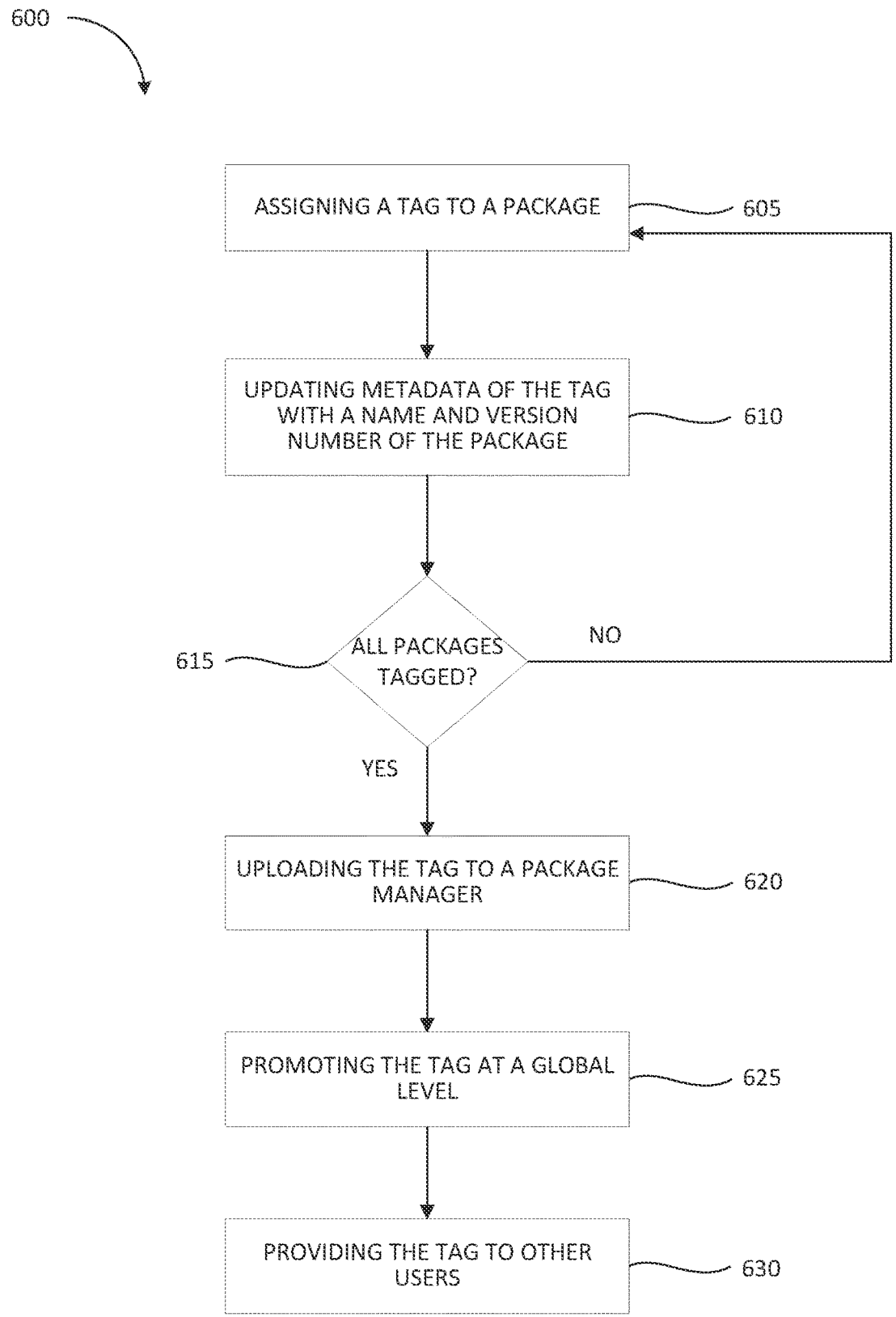
FIG. 6 is a flow diagram of a method of updating tags and promoting tags at a global level, in accordance with some embodiments of the present disclosure.

FIG. 6 is a flow diagram of a method 600 of exchanging tags with other users, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a computing device (e.g., computing device 120 illustrated in FIG. 2A).

As can be seen in FIG. 2A, the host OS 221 may comprise a set of packages 223 that form an application ecosystem. The user may assign (or "mark") certain packages that they wish to group together a tag, thereby defining all of the tagged packages as a logical group. The tag may be associated with metadata indicating which packages are part of the logical group and a version of each package that is part of the logical group (hereinafter referred to as a "group of packages") as discussed in further detail herein. In some embodiments, the tag may comprise a configuration file in which the metadata may be stored. In other embodiments, the package manager 222A may include a database (not shown) in which the metadata may be stored. As each package 223 is marked with the tag, the metadata associated with the tag may be updated with the name of the package as well as a version of the package. At block 605, the user may mark a package 223 with the tag, resulting in the metadata associated with the tag being updated with the name of the package as well as a version of the package at block 610. At block 615, it may be determined if the user has tagged all of the packages they wish to group. For example, the user may tag a group of packages 223A, 223C, 223D, and 223H with a tag referred to as "X" (as shown in FIG. 2A), which may comprise a configuration file that, upon completion of the tagging, indicates that packages 223A, 223C, 223D, and 223H are a part of group (referred to herein as "group X"). The package manager 222A may be modified with a package tagging module 222B which may enable the package manager 222A to understand the metadata of a tag as well as equip the package manager 222A with the functionality to identify packages in the group of packages defined by the tag based on the metadata. More specifically, the package tagging module 222B may enable the package manager 222A to understand that when a user references a tag in a command, the package manager 222A should reference the tag's associated metadata to infer what packages are part of the group. The package tagging module 222B may further enable the package manager 222A to apply its standard set of operations (e.g., add, remove, exclude from removal, update, exclude from updating) to groups of packages defined by tags instead of packages individually so that the package manager 222A can process groups of packages. At block 620, the tag may be provided to the package manager 222A.

Although a tag can be used to define groups of packages at the local level, embodiments of the present disclosure allow such tags to be pushed up to the package manager 222A at a global level. Thus, a user who has defined a group of packages at a local level using a tag may promote their tag at a global level. More specifically, the package tagging module 222B may allow tags to be understood at a general package manager level (i.e., understood by any package manager e.g., Yum, git etc.), enabling the package manager 222A to exchange tags from across the application ecosystem with other package managers that are similarly enabled. By having this functionality integrated into package managers at a global level instead of locally, embodiments of the present disclosure also prevent the particular users of each local environment from having to define complex scripts etc. to perform this functionality.

Thus, instead of having only a localized version of a tag, at block 625 the package manager 222A may make the tag available at a global level so that other users or groups of users can download the tag and generate the group(s) of packages defined by that tag. This benefits end user experience and consistency by enabling a user to share a group of packages among various package managers and make the group of packages available at an application ecosystem level. At block 630, groups of packages can be downloaded by other users (e.g., system admins etc.) that wish to replicate the user's application ecosystem. Instead of pulling each of the individual packages that create the user's application ecosystem, other users can bind themselves to the user's application ecosystem from a consistency and update management point of view by downloading the user's tags. It should be noted in some embodiments where metadata associated with a tag is stored in a configuration file of the tag, the package manager 222A may simply make the tag available globally, while in other embodiments where metadata associated with the tag is stored in a database of the package manager 222A, the package manager 222A may make the tag and the associated metadata available globally.

As shown in FIG. 4, embodiments of the present disclosure provide consistency across distributed systems (shown in the example of FIG. 4 as computing devices 120, 150, and 180 which may be e.g., a fleet of IoT devices) so that the same user experience may be had across all of them. For example, by making a tag or set of tags available globally, a user can ensure consistency from either an exclude or include perspective for update purposes without individual users needing to create their own specific application ecosystems from scratch. FIG. 4 continues the example of FIG. 3B, where the user has installed the application called "owncloud" (shown in FIG. 3B as "OC") and marked it with tags called "owncloud" (shown in FIG. 3B as 224) and "production" (shown in FIG. 3B as 225). The production tag has also been assigned to other packages 223C, 223D, and 223G running in the application ecosystem while the owncloud tag has also been assigned to package 223C running in the application ecosystem such that the group of packages defined by the owncloud tag is a subset of the group of packages defined by the production tag.

As shown in FIG. 4, package managers of computing devices 150 and 180 (not shown) may download the production and owncloud tags (which have been made globally available by the package manager 222A of computing device 120) and implement application ecosystems that are exact replicas of the application ecosystem of computing device 120. In this way, the users of computing devices 150 and 180 may update only a subset of the packages with the production tag by running a command such as "dnf update --excludetag=owncloud" which will update only the packages assigned the owncloud tag and refrain from updating any of the other packages assigned the production tag.

Figure 7:
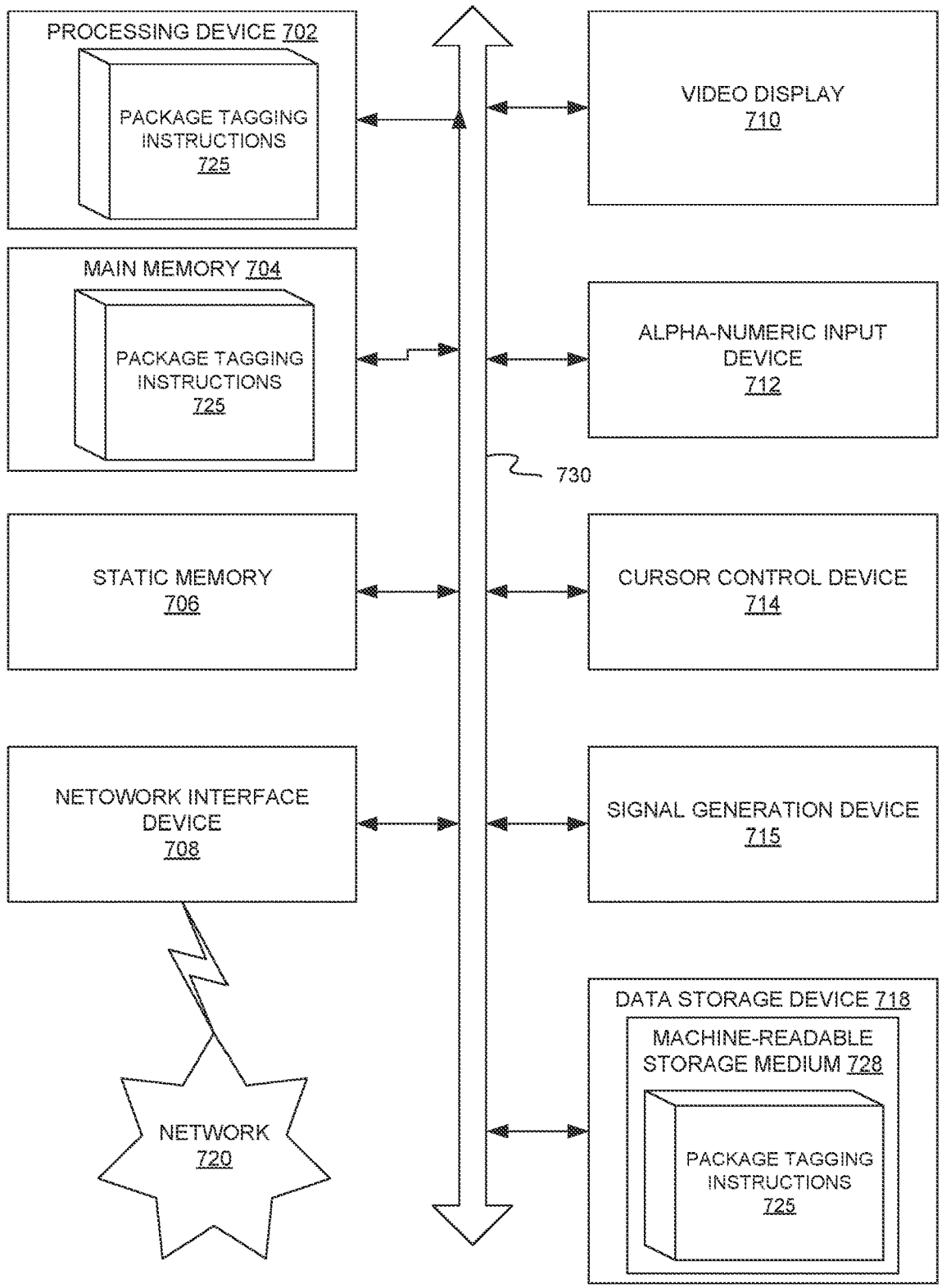
FIG. 7 is a block diagram of an example computing device that may perform one or more of the operations described herein, in accordance with some embodiments of the present disclosure.

FIG. 7 illustrates a diagrammatic representation of a machine in the example form of a computer system 700 within which a set of instructions, for causing the machine to perform any one or more of the methodologies discussed herein for creating and operating on logical groups of packages (e.g., using a package manager) by tagging individual packages with a tag comprising a configuration file having metadata for identifying group of packages.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 717 (e.g., a speaker). In one embodiment, video display unit 710, alphanumeric input device 712, and cursor control device 714 may be combined into a single component or device (e.g., an LCD touch screen).

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute package tagging instructions 725, for performing the operations and steps discussed herein.

The data storage device 718 may include a machine-readable storage medium 728, on which is stored one or more sets of package tagging instructions 725 (e.g., software) embodying any one or more of the methodologies of functions described herein. The package tagging instructions 725 may also reside, completely or at least partially, within the main memory 704 or within the processing device 702 during execution thereof by the computer system 700; the main memory 704 and the processing device 702 also constituting machine-readable storage media. The package tagging instructions 725 may further be transmitted or received over a network 720 via the network interface device 708.

The machine-readable storage medium 728 may also be used to store instructions to perform a method for object analysis/validation event publishing, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Example 1 is a method comprising: defining, from a plurality of packages that make up an application ecosystem, a group of packages using a tag, wherein the tag comprises a configuration file having metadata associated with the group of packages; providing, by a processing device, the tag to a package manager as part of a command to perform a first operation of a set of operations performed by the package manager on the group of packages, the package manager modified to perform each of the set of operations on one or more of the plurality of packages simultaneously; and performing, by the package manager, the first operation on the group of packages simultaneously using the metadata.

Example 2 is the method of example 1, wherein the metadata associated with the group of packages comprises an indication of each package included in the group of packages and version information for each package included in the group of packages.

Example 3 is the method of example 1, wherein the set of operations comprises: an update packages operation, a refrain from updating packages operation, an install packages operation, a remove packages operation, and a refrain from removing packages operation.

Example 4 is the method of example 2, wherein the first operation is an update packages operation to be performed on the group of packages, and wherein performing the first operation comprises identifying each package of the group of packages based on the metadata.

Example 5 is the method of example 1, further comprising: making the tag available to one or more external package managers at a global level using the package manager; and in response to a request to download the tag by an external package manager of the one or more external package managers, providing the tag to the external package manager.

Example 6 is the method of example 2, wherein defining the group of packages comprises assigning the tag to each of the packages in the group of packages, wherein in response to a package being tagged, the metadata is updated with a name of the package and version information of the package.

Example 7 is the method of example 1, further comprising: defining, from the plurality of packages that make up the application ecosystem, one or more additional groups of packages using a corresponding tag for each additional group of packages; and providing the corresponding tag for each additional group of packages to the package manager.

Example 8 is a system comprising: memory; and a processing device operatively coupled to the memory, the processing device to: assign a tag to each of one or more of a plurality of packages to define a group of packages, wherein the tag comprises a configuration file having metadata associated with each package in the group of packages; receive, by a package manager, a command to perform a first operation of a set of operations on a subset of the plurality of packages, wherein the command references the tag; and in response to receiving the command, perform the first operation based on the metadata.

Example 9 is the system of example 8, wherein the metadata comprises an indication of each package included in the group of packages and version information for each package included in the group of packages.

Example 10 is the system of example 8, wherein the first operation is an update operation on the subset of the plurality of packages and the command references the tag to indicate that packages within the group of packages are to be excluded from the update operation.

Example 11 is the system of example 8, wherein the first operation is a remove operation on the subset of the plurality of packages and the command references the tag to indicate that packages within the group of packages are to be excluded from the remove operation.

Example 12 is the system of example 8, wherein the processing device is further to: make the tag available to one or more external package managers at a global level using the package manager; and in response to a request to download the tag by an external package manager of the one or more external package managers, provide the tag to the external package manager.

Example 13 is the system of example 8, wherein the processing device is further to: define, from the plurality of packages, one or more additional groups of packages using a corresponding tag for each additional group of packages;

and provide the corresponding tag for each additional group of packages to the package manager.

Example 14 is the system of example 8, wherein the package manager is modified to identify which packages of the plurality of packages are part of the group of packages based on the metadata and perform each of the set of operations on multiple packages simultaneously.

Example 15 is a non-transitory computer-readable medium having instructions stored thereon which, when executed by a processing device, cause the processing device to: define, from a plurality of packages that make up an application ecosystem, a group of packages using a tag, wherein the tag comprises a configuration file having metadata associated with the group of packages; provide, by the processing device, the tag to a package manager as part of a command to perform a first operation of a set of operations performed by the package manager on the group of packages, the package manager modified to perform each of the set of operations on one or more of the plurality of packages simultaneously; and perform, by the package manager, the first operation on the group of packages simultaneously using the metadata.

Example 16 is the non-transitory computer-readable medium of example 15, wherein the metadata associated with the group of packages comprises an indication of each package included in the group of packages and version information for each package included in the group of packages.

Example 17 is the non-transitory computer-readable medium of example 15, wherein the set of operations comprises: an update packages operation, a refrain from updating packages operation, an install packages operation, a remove packages operation, and a refrain from removing packages operation.

Example 18 is the non-transitory computer-readable medium of example 16, wherein the first operation is an update packages operation to be performed on the group of packages, and wherein to perform the first operation the processing device is to identify each package of the group of packages based on the metadata.

Example 19 is the non-transitory computer-readable medium of example 15, wherein the processing device is further to: make the tag available to one or more external package managers at a global level using the package manager; and in response to a request to download the tag by an external package manager of the one or more external package managers, providing the tag to the external package manager.

Example 20 is the non-transitory computer-readable medium of example 16, wherein to define the group of packages the processing device is to assign the tag to each of the packages in the group of packages, wherein in response to a package being tagged, the metadata is updated with a name of the package and version information of the package.

Example 21 is the non-transitory computer-readable medium of example 15, wherein the processing device is further to: define, from the plurality of packages that make up the application ecosystem, one or more additional groups of packages using a corresponding tag for each additional group of packages; and provide the corresponding tag for each additional group of packages to the package manager.

Example 22 is a method comprising: assigning a tag to each of one or more of a plurality of packages to define a group of packages, wherein the tag comprises a configuration file having metadata associated with each package in the group of packages; receiving, by a package manager, a command to perform a first operation of a set of operations on a subset of the plurality of packages, wherein the command references the tag; and in response to receiving the command, performing, by a processing device, the first operation based on the metadata.

Example 23 is the method of example 22, wherein the metadata comprises an indication of each package included in the group of packages and version information for each package included in the group of packages.

Example 24 is the method of example 22, wherein the first operation is an update operation on the subset of the plurality of packages and the command references the tag to indicate that packages within the group of packages are to be excluded from the update operation.

Example 25 is the method of example 22, wherein the first operation is a remove operation on the subset of the plurality of packages and the command references the tag to indicate that packages within the group of packages are to be excluded from the remove operation.

Example 26 is the method of example 22, wherein the processing device is further to: make the tag available to one or more external package managers at a global level using the package manager; and in response to a request to download the tag by an external package manager of the one or more external package managers, provide the tag to the external package manager.

Example 27 is the method of example 22, wherein the processing device is further to: define, from the plurality of packages, one or more additional groups of packages using a corresponding tag for each additional group of packages; and provide the corresponding tag for each additional group of packages to the package manager.

Example 28 is the method of example 22, wherein the package manager is modified to identify which packages of the plurality of packages are part of the group of packages based on the metadata and perform each of the set of operations on multiple packages simultaneously.

Example 29 is a system comprising: a memory; and a processing device operatively coupled to the memory, the processing device to: define, from a plurality of packages that make up an application ecosystem, a group of packages using a tag, wherein the tag comprises a configuration file having metadata associated with the group of packages; provide, by the processing device, the tag to a package manager as part of a command to perform a first operation of a set of operations performed by the package manager on the group of packages, the package manager modified to perform each of the set of operations on one or more of the plurality of packages simultaneously; and perform, by the package manager, the first operation on the group of packages simultaneously using the metadata.

Example 30 is the system of example 29, wherein the metadata associated with the group of packages comprises an indication of each package included in the group of packages and version information for each package included in the group of packages.

Example 31 is the system of example 29, wherein the set of operations comprises: an update packages operation, a refrain from updating packages operation, an install packages operation, a remove packages operation, and a refrain from removing packages operation.

Example 32 is the system of example 30, wherein the first operation is an update packages operation to be performed on the group of packages, and wherein to perform the first operation, the processing device is to identify each package of the group of packages based on the metadata.

Example 33 is the system of example 29, wherein the processing device is further to: make the tag available to one or more external package managers at a global level using the package manager; and in response to a request to download the tag by an external package manager of the one or more external package managers, provide the tag to the external package manager.

Example 34 is the system of example 30, wherein to define the group of packages, the processing device is to: assign the tag to each of the packages in the group of packages, wherein in response to a package being tagged, the metadata is updated with a name of the package and version information of the package.

Example 35 is the system of example 29, wherein the processing device is further to: define, from the plurality of packages that make up the application ecosystem, one or more additional groups of packages using a corresponding tag for each additional group of packages; and provide the corresponding tag for each additional group of packages to the package manager.

Example 36 is an apparatus comprising: means for defining, from a plurality of packages that make up an application ecosystem, a group of packages using a tag, wherein the tag comprises a configuration file having metadata associated with the group of packages; means for providing, by a processing device, the tag to a package manager as part of a command to perform a first operation of a set of operations performed by the package manager on the group of packages, the package manager modified to perform each of the set of operations on one or more of the plurality of packages simultaneously; and means for performing, by the package manager, the first operation on the group of packages simultaneously using the metadata.

Example 37 is the apparatus of example 36, wherein the set of operations comprises: an update packages operation, a refrain from updating packages operation, an install packages operation, a remove packages operation, and a refrain from removing packages operation.

Example 38 is the method of example 37, wherein the first operation is an update packages operation to be performed on the group of packages, and wherein performing the first operation comprises identifying each package of the group of packages based on the metadata.

Example 39 is the method of example 36, further comprising: means for making the tag available to one or more external package managers at a global level using the package manager; and in response to a request to download the tag by an external package manager of the one or more external package managers, providing the tag to the external package manager.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
defining, from a plurality of packages that make up an application ecosystem, a group of packages using a tag, wherein the tag is associated with metadata corresponding to the group of packages;
providing to a package manager, by a processing device, a command to perform a first operation of a set of operations performed by the package manager on the group of packages, the command referencing the tag and wherein the package manager is modified to perform each of the set of operations on one or more of the plurality of packages simultaneously; and performing, by the package manager, the first operation on the group of packages simultaneously using the metadata.

2. The method of claim 1, wherein the metadata comprises an indication of each package included in the group of packages and version information for each package included in the group of packages.

3. The method of claim 1, wherein the set of operations comprises: an update packages operation, a refrain from updating packages operation, an install packages operation, a remove packages operation, and a refrain from removing packages operation.

4. The method of claim 2, wherein the first operation is an update packages operation to be performed on the group of packages, and wherein performing the first operation comprises identifying each package of the group of packages based on the metadata.

5. The method of claim 1, further comprising:
making the tag available to one or more external package managers at a global level using the package manager; and
in response to a request to download the tag by an external package manager of the one or more external package managers, providing the tag to the external package manager.

6. The method of claim 2, wherein defining the group of packages comprises assigning the tag to each of the packages in the group of packages, wherein in response to a package being tagged, the metadata is updated with a name of the package and version information of the package.

7. The method of claim 1, further comprising:
defining, from the plurality of packages that make up the application ecosystem, one or more additional groups of packages using a corresponding tag for each additional group of packages; and
providing the corresponding tag for each additional group of packages to the package manager.

8. A system comprising:
a memory; and
a processing device operatively coupled to the memory, the processing device to:
assign a tag to each of one or more of a plurality of packages to define a group of packages, wherein the tag is associated with metadata corresponding to each package in the group of packages;
receive, by a package manager, a command to perform a first operation of a set of operations on a subset of the plurality of packages, wherein the command references the tag; and
in response to receiving the command, perform the first operation based on the metadata.

9. The system of claim 8, wherein the metadata comprises an indication of each package included in the group of packages and version information for each package included in the group of packages.

10. The system of claim 8, wherein the first operation is an update operation on the subset of the plurality of packages and the command references the tag to indicate that packages within the group of packages are to be excluded from the update operation.

11. The system of claim 8, wherein the first operation is a remove operation on the subset of the plurality of packages and the command references the tag to indicate that packages within the group of packages are to be excluded from the remove operation.

12. The system of claim 8, wherein the processing device is further to:
make the tag available to one or more external package managers at a global level using the package manager; and
in response to a request to download the tag by an external package manager of the one or more external package managers, provide the tag to the external package manager.

13. The system of claim 8, wherein the processing device is further to:
define, from the plurality of packages, one or more additional groups of packages using a corresponding tag for each additional group of packages; and
provide the corresponding tag for each additional group of packages to the package manager.

14. The system of claim 8, wherein the package manager is modified to identify which packages of the plurality of packages are part of the group of packages based on the metadata and perform each of the set of operations on multiple packages simultaneously.

15. A non-transitory computer-readable medium having instructions stored thereon which, when executed by a processing device, cause the processing device to:
define, from a plurality of packages that make up an application ecosystem, a group of packages using a tag, wherein the tag is associated with metadata corresponding to the group of packages;
provide to a package manager, by the processing device, a command to perform a first operation of a set of operations performed by the package manager on the group of packages, the command referencing the tag and wherein the package manager is modified to perform each of the set of operations on one or more of the plurality of packages simultaneously; and
perform, by the package manager, the first operation on the group of packages simultaneously using the metadata.

16. The non-transitory computer-readable medium of claim 15, wherein the metadata comprises an indication of each package included in the group of packages and version information for each package included in the group of packages.

17. The non-transitory computer-readable medium of claim 15, wherein the set of operations comprises: an update packages operation, a refrain from updating packages operation, an install packages operation, a remove packages operation, and a refrain from removing packages operation.

18. The non-transitory computer-readable medium of claim 16, wherein the first operation is an update packages operation to be performed on the group of packages, and wherein to perform the first operation the processing device is to identify each package of the group of packages based on the metadata.

19. The non-transitory computer-readable medium of claim 15, wherein the processing device is further to:
make the tag available to one or more external package managers at a global level using the package manager; and
in response to a request to download the tag by an external package manager of the one or more external package managers, providing the tag to the external package manager.

20. The non-transitory computer-readable medium of claim 16, wherein to define the group of packages the processing device is to assign the tag to each of the packages in the group of packages, wherein in response to a package being tagged, the metadata is updated with a name of the package and version information of the package.

* * * * *